Aug. 23, 1955

C. M. HILL 2,715,997

BINARY ADDERS

Filed Dec. 28, 1953

2 Sheets-Sheet 1

INVENTOR
Charles M. Hill.
BY
Robert W. Hampton

Aug. 23, 1955 C. M. HILL 2,715,997

BINARY ADDERS

Filed Dec. 28, 1953 2 Sheets-Sheet 2

INVENTOR
Charles M. Hill.
BY
Robert W. Hampton

United States Patent Office 2,715,997

Patented Aug. 23, 1955

2,715,997

BINARY ADDERS

Charles M. Hill, Alameda County, Calif., assignor to Marchant Research, Inc., a corporation of California Application December 28, 1953, Serial No. 400,522

15 Claims. (Cl. 235—61)

The present invention relates to electronic digital computers and more particularly concerns improved serial adder circuits for use in such computers.

Most of the electronic digital computers known in the art perform arithmetic operations in the binary system or in some modification thereof. Such computers frequently employ an "internal memory" for temporarily storing representations of multi-digit binary numbers, or "words" which are to be arithmetically operated upon or combined. The internal memory may comprise devices having a low access time, such, for example, as binary trigger circuit registers or recirculation tracks on a magnetic medium. The following description, for purposes of illustration, will relate to a computer in which the internal memory comprises three channels, each of which includes a register comprising a plurality of bistable elements. The bistable elements, per se, will be described as vacuum tube bistable multivibrators, although they may comprise any equivalent element such as ferromagnetic "flip-flops," for example.

With relation to the manner in which the arithmetic operations in such machines are performed, these machines may be divided into two general classes, namely, parallel and serial. The parallel machines are identified by operation upon all digits of a word simultaneously, whereas the serial machines operate upon the digits of a word one at a time.

In serial machines in particular, the above-mentioned registers are generally of the type known as "shifting registers," i. e., the words are shifted into, through, and out of such registers digit-by-digit, so that each word is in the form of a pulse sequence. If the words in two of the channels constitute operands which are to be combined additively, they are simultaneously shifted, digit-by-digit, out of the register and into an adder circuit which adds the successive columnar pairs of operand digits seriatium, making provisions for any carry from one column to the next.

There are several such adder circuits known in the art. They are generally of four kinds, viz: (1) those employing pulse coincidence amplifiers, or amplitude adders; (2) those employing diode matrixes; (3) the diode gate adders known as "logical adders"; and (4) pulse counting, or noncoincidence adders such as described in the co-pending application Serial No. 344,025, filed March 23, 1953 by George B. Greene. The adders which employ pulse coincidence amplifiers are critical in operation in that they require precision timing to achieve proper pulse coincidence. The diode matrixes and logical adders are notable primarily for the large amount of power which they consume, in addition to their use of a large number of diodes which are reliable only if expensive types are used. They noncoincidence adders heretofore disclosed, although less critical than the pulse coincidence adders and less power consuming than diode adders, require somewhat complicated circuitry.

The noncoincidence adders which are disclosed and claimed herein are improved and simplified in relation to previous adders, and they are more reliable by virtue of employing less circuitry. The principal object of the present invention is therefore to provide an improved noncoincidence adder for combining first and second pulse-sequence binary words to form a third pulse sequence which represents an arithmetic combination of the first and second binary words.

A more specific object is to improve the application of pulse counting techniques to the arithmetic combination of two pulse sequence binary words.

Another object is to reduce the number of electronic elements necessary to combine such pulse sequences.

Another object is to provide a simple noncoincidence circuit for adding the values represented by two pulse sequences.

A further object is to provide a circuit for subtracting a pulse sequence representing a value from another pulse sequence representing a larger value.

Another object is to provide an upcount noncoincidence adder which employs only one bistable element.

A further object is to provide an arithmetic adder which employs only two bistable elements.

The underlying principle of the present invention is, therefore, the application of simplified pulse counting techniques to the additive and/or arithmetic combination of a plurality of pulse sequence binary words.

*General description*

The computer which employs an adder of the present type is a "time base" computer, i. e., it comprises a synchronous system controlled by timing pulses that are generated by some appropriate element in the computer. The timing pulses are received by shifting registers in groups, the number of pulses in each group being equal to the number of digits in a word. Each timing pulse received by a register shifts the operand contained in that register one digital column, the direction of shift being from the highest to the lowest digital position.

Each register has a number of columns equal to the number of digits of an operand word so that after an operand is completely contained in a register, having been shifted into the register digit-by-digit, the next shift causes the digit in the lowest position of the operand to leave the register and, in the present invention, to enter an adder. Each digit that enters the adder from an operand register may be either a "0" or a "1," and is represented by a negative voltage pulse which may, for certain applications, be reversed in polarity by a suitable pulse transformer. To distinguish between the two kinds of digits, "0" and "1," separate leads from the register are used, a pulse on one lead representing a "0" and a pulse on the other lead representing a "1." The timing is such that corresponding digits of the "words" in the two operand registers are shifted out of the operand registers synchronously. The arithmetic operations within the adder are performed in response to the digit pulses during the "digit interval" between the timing pulses, and the result of the adder operation is shifted into a result register during this digit interval. It is possible to employ one of the operand registers as the result register because, when the operand digit in the most significant position of an operand register is shifted, that position becomes available for the least significant digit of the result.

The manner in which the present adders perform additive and arithmetic operations will be set forth following a description of the circuit elements employed in the invention.

*Circuit elements*

*Trigger circuit.*—One of the basic elements employed in the present invention is a circuit having two stable states of operation such, for example, as the well-known Eccles-Jordan vacuum tube bistable multivibrator, conveniently designated a "trigger circuit" and described in "Theory and Application of Electron Tubes" by H. J. Reich. In one of its simplest forms, a trigger circuit of this nature comprises two triode vacuum tubes in which the grid of each tube is coupled to the anode of the other tube through a respective network comprising a resistor in parallel with a capacitor. It is well known that such a circuit has two stable operation conditions, namely, with either of the two tubes conducting and its companion tube non-conducting.

Figure 1:
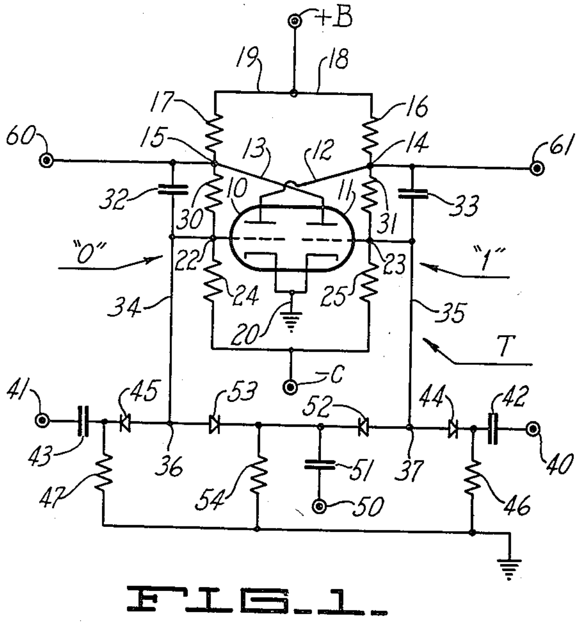
Fig. 1 is a wiring diagram of a typical trigger circuit as employed as a component in the present invention.

A standard modification of such a trigger circuit is shown as T in Fig. 1. The trigger circuit T comprises two vacuum triodes 10 and 11, shown for convenience as the two sections of a twin triode. The lefthand triode 10 is hereinafter called the "0" side and the trigger is said to be "reset" when the "0" side is conducting. The righthand triode 11 is hereinafter called the "1" side and the trigger is said to be "set" when the "1" side is conducting.

The anode of the "0" side of the trigger is connected by a lead 12, a junction 14, a resistor 16, and a lead 18 to a terminal +B which is a source of positive potential. Similarly, the anode of the "1" side of the trigger is connected by a lead 13, a junction 15, a resistor 17, and a lead 19 to the terminal +B. The cathodes of both sides are connected by a common cathode lead 20 to ground.

The grid of the "0" side is connected through a junction 22 and a resistor 24 to a terminal −C which is a source of negative grid bias potential. The grid of the "1" side is similarly connected through a junction 23 and a resistor 25 to the terminal −C. The grid of the "0" side is also connected by means of junction 22, a resistor 30 in parallel with a capacitor 32, and junction 15, to the anode of the "1" side. The grid of the "1" side is similarly connected by means of junction 23, a resistor 31 in parallel with a capacitor 33, and junction 14, to the anode of the "0" side.

A "set" input terminal 41 is connected by a capacitor 43, a diode 45, a junction 36, a lead 34, and junction 22, to the grid of the "0" side. A "reset" input terminal 40 is connected by a capacitor 42, a diode 44, a junction 37, a lead 35, and junction 23, to the grid of the "1" side. A first bleeder resistor 47 is connected to ground from a point between capacitor 43 and diode 45, and a second bleeder resistor 46 is connected to ground from a point between capacitor 42 and diode 44. A "symmetrical" input terminal 50 is connected through a capacitor 51, two diodes 52 and 53, and junctions 37 and 36, respectively, to the grids of both sides. A bleeder resistor 54 is connected to ground from a point between diode 52 and diode 53.

A negative pulse applied to the symmetrical terminal 50 invariably reverses the trigger as follows. Assuming that the "0" side is initially conducting, a negative pulse applied to terminal 50 is transmitted through diode 53 to the grid of the "0" side but is blocked from the "1" side for the following reasons.

Since the "0" side is conducting, junction 23 is at a relatively low potential. The circuit parameters and the potential value of the grid bias source −C are so chosen that the relatively low potential of junction 23 is below ground potential by an amount at least equal to the value of the input pulses applied to terminal 50. Therefore, the potential of the lefthand side of diode 52 cannot drop below the potential of the righthand side of that diode in response to the pulse applied to terminal 50, and the pulse is blocked. Similarly, if the "1" side of the trigger T is conducting, diode 53 blocks a pulse applied to terminal 50.

The negative pulse applied to the "0" grid decreases conduction on the "0" side, so that the potential at junction 14 rises. This rise in potential is transmitted by capacitor 33 to the grid of the "1" side to initiate conduction in the "1" side. Conduction of the "1" side decreases the potential at junction 15, thereby lowering the grid potential of the "0" side to further reduce conduction in the "0" side. The decrease in conduction in the "0" side and the increase in conduction in the "1" side continue until a stable state is reached with the "1" side fully conducting and the "0" side fully cut off. Subsequent negative pulses applied to terminal 50 similarly reverse conduction from one side to the other.

A negative pulse applied to the set terminal 41 sets the trigger to "1" if it is conducting on the "0" side, but has no effect on the trigger if it is already set to "1". Assuming once again that the trigger is conducting on the "0" side, a negative pulse is applied to terminal 41. This pulse is transmitted by capacitor 43, diode 45, and lead 34 to the grid of the "0" side. Diode 53 prevents the pulse from being transmitted to the grid of the "1" side. The negative pulse on the grid of the "0" side causes conduction to transfer from the "0" side to the "1" side as hereinbefore described. In a similar manner, a negative pulse applied to the reset terminal 40 resets the trigger to "0" if it is conducting on the "1" side, but has no effect on the trigger if it is already reset to "0".

The trigger circuit is adapted to control other devices by means of the changing potential levels at junctions 14 and 15. If the trigger is conducting on the "0" side, junction 15 is at a high potential and junction 14 is at a low potential; conversely, when the "1" side is conducting, junction 14 is at a high potential and junction 15 is at a low potential. The control output terminals 60 and 61, which are connected to junctions 15 and 14, respectively, are used for applying these potentials to other devices.

Figure 2:
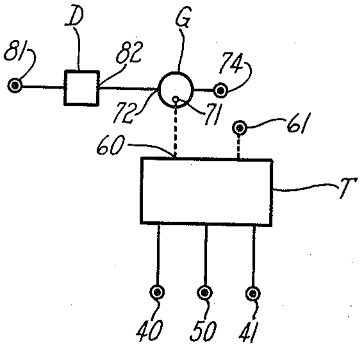
Fig. 2 is a block diagram illustrating the relationships between the circuit componentes shown in Figs. 1, 3, and 4.

In Fig. 2, the trigger circuit T is shown as a rectangle with the symmetrical input terminal 50 at the bottom center of the rectangle and the reset and set input terminals 40 and 41 at the bottom left and the bottom right of the rectangle, respectively. The control output terminals 60 and 61 are shown at the top left and top right of the rectangle, respectively.

Figure 3:
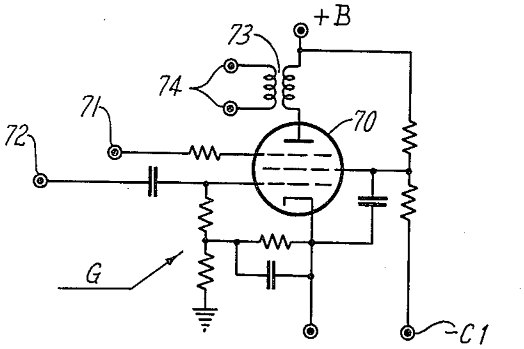
Fig. 3 is a wiring diagram of a typical single-arming gate as employed in the present invention.

*Single-arming gate.*—A second element employed in the present invention is a normally disabled transducing means, such as a single-arming gate, an example of which is the well-known pentode gate shown as G in Fig. 3. Gate G comprises a pentode 70 which is normally biased well below cutoff by means of a screen grid bias source −C1, but which can be biased to slightly below cutoff by a single arming control comprising a terminal 71 connected to the suppressor grid of the pentode. In the adders of the present invention, each gate G is controlled by a trigger circuit T, terminal 71 of the gate being connected to the appropriate control output terminal 60 or 61 of the trigger circuit. When the potential of the related control output terminal is low, pentode 70 is biased well below cutoff, and the gate is said to be "closed"; when the control potential is high, the bias is raised to slightly below cutoff, and the gate is said to be "armed." Gate G is interrogated by positive pulses applied to a terminal 72 which is capacitively coupled to the control grid of the pentode. If an interrogating pulse is applied to terminal 72 while the gate is closed, pentode 70 remains cut off; but if the gate is interrogated while it is armed, then the pulse on terminal 72 causes pentode 70 to conduct, energizing the primary winding of a pulse transformer 73 in the anode circuit of the tube. Thus the combination of at least one gate and a trigger circuit constitute an electronic switch. An output pulse may be taken from either of a pair of terminals 74, which are connected to opposite ends of the transformer secondary, according to the desired polarity of the pulse.

In Fig. 2, gate G is shown as a circle having within it a smaller circle connected to the control output terminal 60 of the trigger circuit T. This represents a typical arming connection from a trigger circuit, and indicates that gate G is armed when and only when trigger circuit T stands reset to "0." In the accompanying drawings, control connections for arming gates and the like are shown as broken lines, whereas pulse leads are shown as solid lines.

Figure 4:
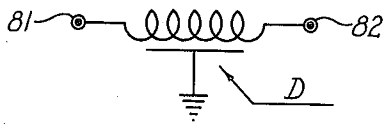
Fig. 4 is a schematic wiring diagram of a typical delay circuit as employed in the present invention.
Figure 5:
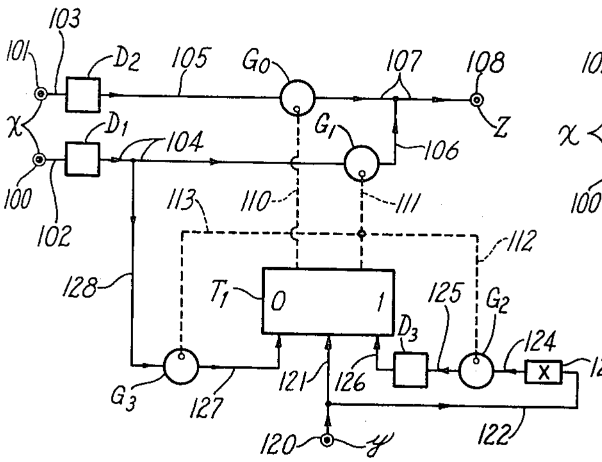
Fig. 5 is a block diagram of a first embodiment of the upcount adder.

*Delay circuit.*—A third element employed in the invention is a delay circuit, a typical example of which is shown schematically in Fig. 4 as a distributed parameter delay line D of the type disclosed in Fig. 5 of U. S. Patent No. 2,467,857, issued April 19, 1949 to J. H. Rubel, et al., to which reference is made for a full description. It is to be understood that other delay circuits, such as lumped parameter delay lines may be employed. Pulses impressed upon an input terminal 81 of delay line D are delayed a few microseconds or a fraction of a microsecond and appear at an output terminal 82. In Fig. 2, a delay circuit is shown as a small square.

*Binary arithmetic*

The following is an analysis of the binary arithmetic performed by the adders of the present invention.

In binary addition, there are four possible additive combinations of two positive operands.

| | | | | |
|---|---|---|---|---|
| $x$ | 0 | 1 | 0 | 1 |
| $+y$ | +0 | +0 | +1 | +1 |
| Sum | 0 | 1 | 1 | 0 (carry +1) |

It is noted that a carry occurs in the last sum. In a multi-digit binary addition, the operation of entering the carry into the next higher column gives rise to a second set of four additive combinations:

| | | | | |
|---|---|---|---|---|
| +Carry | +1 | +1 | +1 | +1 |
| $x$ | 0 | 1 | 0 | 1 |
| $+y$ | +0 | +0 | +1 | +1 |
| Sum | 1 | 0 (carry +1) | 0 (carry +1) | 1 (carry +1) |

Similarly, the subtraction of a binary number from another binary number gives rise to four algebraic combinations:

| | | | | |
|---|---|---|---|---|
| $x$ | 0 | 1 | 1 | 0 |
| $-y$ | −0 | −0 | −1 | −1 |
| Difference | 0 | 1 | 0 | 1 (carry −1) |

It is noted that a carry of −1 is part of the result of the last combination. This carry of −1 gives rise to a second set of algebraic combinations wherein the first four combinations are combined with the carry of −1:

| | | | | |
|---|---|---|---|---|
| −Carry | −1 | −1 | −1 | −1 |
| $x$ | 0 | 1 | 1 | 0 |
| $-y$ | −0 | −0 | −1 | −1 |
| Difference | 1 (carry −1) | 0 | 1 (carry −1) | 0 (carry −1) |

One of the circuits of the present invention is adapted to solve the above sixteen addition and subtraction problems and is designated an arithmetic adder. A simpler circuit that can solve only the eight addition problems is designated an "upcount" adder, and, since it comprises part of the arithmetic adder, it will be described first.

*Upcount adder, first embodiment*

The adding, or upcount, circuit of the present invention carries out the operations of adding a word contained in a register $y$ to a word contained in a register $x$ and entering the sum into a register $z$. (None of the registers are shown.) The circuit adds the digit in each column in the $y$ register to the corresponding digit in the $x$ register and the sum is shifted into the $z$ register. If a carry results from a columnar addition, the circuit stores the carry digit and adds it to the next columnar pair of operand digits. In theory of operation, the $x$ operand passes through the adder and is modified by the $y$ operand. Therefore, in order that the $y$ operand may set up the control conditions, it is entered into the adder before the $x$ operand.

Referring to Fig. 5, the adding circuit comprises a single trigger $T_1$ and a series of gates $G_0$, $G_1$, $G_2$ and $G_3$ which are armed by trigger $T_1$. The "0" control output terminal of the trigger is connected to gate $G_0$ by a control lead 110 so that when the trigger is reset the gate $G_0$ is armed. Similarly, the "1" control output terminal of the trigger is connected to gates $G_1$, $G_2$ and $G_3$ by control leads 111, 112 and 113, respectively, so that when the trigger is set, gates $G_1$ to $G_3$ are armed.

Positive pulses representing the digit "0" are applied to a terminal 100 and from the $x$ register, and positive pulses representing the digit "1" are applied to terminal 101, also from the $x$ register. Terminal 100 is connected through a lead 102, a delay line $D_1$, and a lead 104 to the interrogation input of gate $G_1$. The output of gate $G_1$ is connected to a result output terminal 108 by a lead 106 and a lead 107, and terminal 108 is connected to the input of the $z$ register. Similarly, terminal 101 is connected through a lead 103, a delay line $D_2$, and a lead 105 to the interrogation input of gate $G_0$. The output of gate $G_0$ is connected to the result output terminal 108 by lead 107. If an output pulse appears on terminal 108 during a given digit interval, a "1" is shifted into the $z$ register; if no output pulse appears on terminal 108 during that interval, a "0" is shifted into the $z$ register.

Pulses representing the "1's" output of the $y$ register are applied through a terminal 120 and a lead 121 to the symmetrical input of the trigger. A lead 122 connects lead 121 through a suitable pulse transformer 123 and a lead 124 to the input of gate $G_2$, and the output of gate $G_2$ is connected through a lead 125, a delay line $D_3$, and a lead 126 to the set terminal of the trigger. A lead 128 connects lead 104 to the input of gate $G_3$, and the output of gate $G_3$ is connected by a lead 127 to the reset terminal of the trigger.

In order to fully set forth the operation of the upcount circuit, its response to each of the eight previously outlined addition combinations is described.

In the first combination, the value in both of the operand register is a "0," and the trigger initially stands at "0." When the values in the operand registers are shifted into the adder, no pulse is transmitted to the adder from the $y$ register; therefore, the trigger remains reset to "0." Then, a delayed positive pulse representing the value "0" is received from the $x$ register by lead 104. Since the trigger is reset, gate $G_1$ is not armed; therefore, when the pulse that has been applied to lead 104 interrogates gate $G_1$, no pulse is transmitted to terminal 108. The absence of a pulse at terminal 108 causes a sum digit of "0" to be shifted into the $z$ register. If the value in the $x$ register is a "1" (second combination), in which case a delayed pulse is applied to lead 105, this pulse is transmitted through the armed gate $G_0$ to terminal 108 and a sum digit of "1" is shifted into the $z$ register.

In the third and fourth combinations, the trigger initially stands at "0" and the value "1" is in the $y$ register. As the "1" is shifted out of the $y$ register, a negative pulse is applied to lead 121 which causes the trigger to be set to "1," arming gates $G_1$, $G_2$ and $G_3$. In the third combination, a delayed "0" pulse from the $x$ register passes through the armed gate $G_1$ to terminal 108 so that a sum digit of "1" is shifted into the $z$ register, and the same pulse passes through the armed gate $G_3$ to reset the trigger to "0." In the fourth combination, a "1" pulse from the $x$ register is blocked by the unarmed gate $G_0$, so that no pulse appears on terminal 108 and a sum digit of "0" is shifted into the $z$ register. The trigger remains set to "1" to indicate a stored carry digit of "1."

In combinations 5 to 8, inclusive, the trigger initially stands set to "1" before the pulses from the operand registers are received, indicating a carry from the previous column; therefore, gates $G_1$—$G_3$ are armed.

In the fifth combination, the value "0" stands in both of the operand registers. Since no pulse is applied to the symmetrical input of the trigger, gates $G_1$ and $G_3$ remain armed, and when the "0" $x$ operand pulse is applied to terminal 100, it passes through gate $G_1$ to terminal 108, so that a sum digit of "1" is shifted into the $z$ register. The "0" pulse also passes through gate $G_3$ to reset the trigger. In the sixth combination, the value in the $x$ register is a "1," applying a pulse to terminal 101. This pulse is blocked by the unarmed gate $G_0$, so that no pulse appears on terminal 108 and a sum digit of "0" is shifted into the $z$ register. The trigger remains set to "1," thus indicating another carry.

In combinations 7 and 8, the trigger is initially set to "1" and the value "1" is in the $y$ register. The "1" pulse from the $y$ register passes through the armed gate $G_2$ and into delay line $D_3$. This pulse also resets the trigger to "0." The delay time associated with delay line $D_3$ is greater than that associated with delay lines $D_1$ and $D_2$, so that the adder receives the $x$ operand pulse before it receives the pulse passed through gate $G_2$. After $T_1$ is reset to "0" by the $y$ operand pulse, a "0" $x$ operand pulse (in the seventh combination) appears on lead 104 and is blocked by the now unarmed gate $G_1$, so that no pulse appears at terminal 108 and a sum digit of "0" is shifted into the $z$ register. Subsequently, the delayed pulse in $D_3$ sets the trigger back to "1," indicating a carry. In the eighth combination, after $T_1$ is reset to "0" by the $y$ operand pulse, a "1" $x$ operand pulse appears on lead 105 and is passed through the now armed gate $G_0$, so that a pulse appears on terminal 108 and a sum digit of "1" is shifted into the $z$ register. Subsequently, the delayed pulse in $D_3$ sets the trigger back to "1," indicating a carry.

SECOND EMBODIMENT

Figure 6:
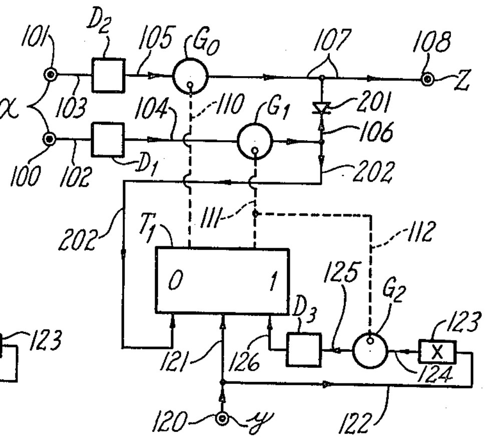
Fig. 6 is a block diagram of a second embodiment of the upcount adder.

The second embodiment of the present invention is a modification of the first embodiment wherein one of the gates is eliminated. Referring to Figs. 5 and 6, the structure of the adder in the second embodiment is similar to that of the first embodiment except that the gate $G_3$ (Fig. 5) is eliminated and a diode 201 (Fig. 6) is added. It will be noted that in the first embodiment, every time a "0" pulse from the $x$ register is transmitted to the output terminal 108 the same pulse causes trigger $T_1$ to be reset to "0" by means of lead 128, gate $G_3$ and lead 127. Since gates $G_1$ and $G_3$ (Fig. 5) are always armed or unarmed together, a pulse applied from the output of gate $G_1$ to the reset terminal of the trigger is the equivalent of a pulse applied from the output of gate $G_3$ to the same reset terminal. Accordingly, in Fig. 6, a lead 202 connects the output of gate $G_1$ to the reset terminal of the trigger. Diode 201 is inserted between leads 202 and 107 to prevent output pulse from gate $G_0$ from resetting the trigger. In all other respects, the second embodiment operates in the same manner as the first embodiment.

*Arithmetic adder*

Figure 7:
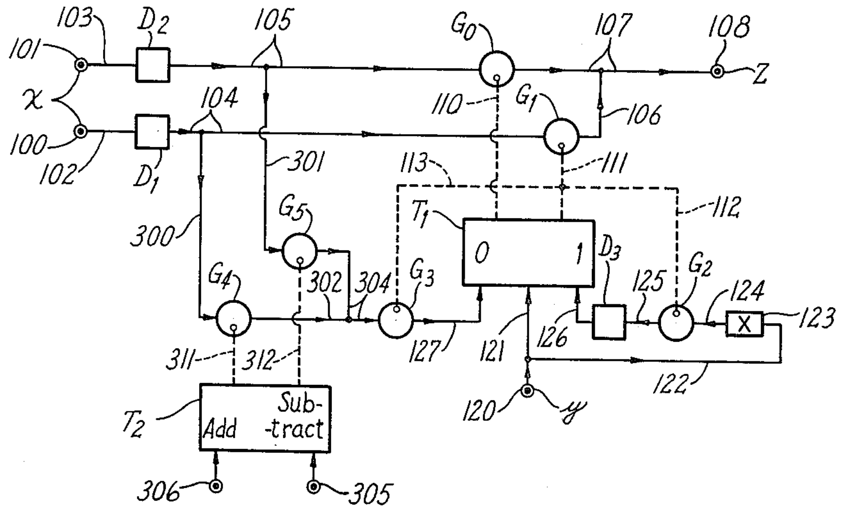
Fig. 7 is a block diagram of the arithmetic adder.

The arithmetic adder is a circuit which adds two numbers or subtracts a smaller number from a larger number. Referring to Fig. 7, certain portions of the arithmetic adder are similar to portions of the first embodiment of the upcount adder (Fig. 5) and are correspondingly numbered. The additions in Fig. 7 are a second trigger $T_2$, a gate $G_4$, and a gate $G_5$. The trigger $T_2$ is employed for determining the nature of the operation, namely, add or subtract. When trigger $T_2$ is reset to "add," the word in the $y$ register is added to the word in the $x$ register, and when $T_2$ is set to "subtract" the word in the $y$ register is subtracted from the word in the $x$ register. The sum or difference is shifted into the $z$ register as in the upcount adders. The trigger $T_2$ is set or reset by a negative pulse applied to a respective operation control terminal 305 or 306.

Referring to Fig. 7, the arming terminal of gate $G_4$ is connected by a control lead 311 to the "add" output terminal of trigger $T_2$; therefore, gate $G_4$ is armed when $T_2$ is reset. The input of gate $G_4$ has a connecting lead 300 from lead 104 which, as in the prior embodiments, transmits delayed "0's" pulses from the $x$ register. The output of gate $G_4$ is connected by a lead 302 to the input of gate $G_3$. The arming terminal of gate $G_5$ is connected by a control lead 312 to the "subtract" output terminal of trigger $T_2$; therefore, gate $G_5$ is armed when trigger $T_2$ is set. The input of gate $G_5$ has a connecting lead 301 from lead 105 which, as in the prior embodiments, transmits delayed "1's" pulses from the $x$ register. The output of gate $G_5$ is connected by a lead 304 to the input of gate $G_3$.

When the trigger $T_2$ is reset to "add," and consequently gate $G_4$ is armed, the arithmetic adder operates in the same manner as the first embodiment of the upcount adder, the lead 300, armed gate $G_4$, and lead 302 of Fig. 7, replacing lead 128 of Fig. 5.

When trigger $T_2$ is set to "subtract," the digit in each column in the $y$ register is subtracted from the digit in the corresponding column in the $x$ register and if a carry of —1 occurs, the circuit stores the carry until the next columnar pair of digits is subtracted. The result of each columnar subtraction is shifted into the $z$ register.

There are eight possible subtraction combinations, as outlined previously, and each of these eight combinations of subtraction will be considered. In the first four combinations, the trigger $T_1$ is initially reset to "0," indicating the absence of a carry from the previous column.

In combinations 1 and 2, the $y$ operand is "0"; therefore $T_1$ remains reset to "0" and gate $G_0$ remains armed while gates $G_1$—$G_3$ are unarmed. In the first combination, the $x$ operand is a "0." The corresponding pulse on lead 104 is blocked by gate $G_1$, so that a result digit of "0" is shifted into the $z$ register. In the second combination, the $x$ operand is a "1." The corresponding pulse on lead 105 is transmitted to terminal 108 through the armed gate $G_0$, so that a result digit of "1" is shifted into the $z$ register.

In the third combination, the value in both operand registers is a "1." The "1" pulse from the $y$ register reverses trigger $T_1$, thereby arming gates $G_1$—$G_3$. A subsequent "1" pulse from the $x$ register is blocked by the unarmed gate $G_0$, so that a sum digit of "0" is shifted into the $z$ register. The "1" pulse from the $x$ register also passes through the armed gates $G_5$ and $G_3$, and resets $T_1$ to "0," indicating that there is no carry.

In the fourth combination, the subtraction of a "1" in the $y$ register from a "0" in the $x$ register causes a carry of "—1." This is accomplished as follows. The "1" pulse from the $y$ register sets $T_1$ to "1," and the delayed "0" pulse from the $x$ register causes a "1" to be shifted into the $z$ register through the armed gate $G_1$. Trigger $T_1$ remains set to "1" indicating a carry, because there is no active connection between lead 104 and the reset terminal of $T_1$ during the subtraction process.

Combinations 5–8, inclusive, repeat the four above combinations with, in each instance, a —1 carried from the previous column, so that $T_1$ is initially set to "1." In combinations 5 and 6, a "0" pulse from the $y$ register has no effect on the adder and $T_1$ remains set. A delayed "0" pulse from the $x$ register (combination 5)

passes through the armed gate $G_1$; therefore, a result digit of "1" is shifted into the $z$ register. Trigger $T_1$ remains set, indicating another carry of "—1." In the sixth combination, the value in the $x$ register is a "1" causing a pulse to interrogate the unarmed gate $G_0$, so that a result digit of "0" is shifted into the $z$ register. However, the "1" pulse from the $x$ register is transmitted by lead 301, armed gate $G_5$, lead 304, armed gate $G_3$, and lead 127 to reset trigger $T_1$, indicating the absence of a carry to the next column.

In combinations 7 and 8, the trigger $T_1$ is initially set to "1" and the value "1" is in the $y$ register. The "1" pulse from the $y$ registers passes through the armed gate $G_2$ and into delay line $D_3$. This pulse also resets $T_1$ to "0." The delay time associated with delay line $D_3$ is greater than that associated with delay lines $D_1$ and $D_2$, so that the adder receives the $x$ operand pulse before it receives the pulse passed through gate $G_2$. After $T_1$ is reset to "0" by the $y$ operand pulse, a "0" $x$ operand pulse (in the seventh combination) appears on lead 104 and is blocked by the now unarmed gate $G_1$, so that no pulse appears at terminal 108 and a result digit of "0" is shifted into the $z$ register. Subsequently, the delayed pulse in $D_3$ sets $T_1$ back to "1," indicating a negative carry. In the eighth combination, after $T_1$ is reset to "0" by the $y$ operand pulse, a "1" $x$ operand pulse appears on lead 105 and is passed through the now armed gate $G_0$, so that a pulse appears on terminal 108 and a result digit of "1" is shifted into the $z$ register. Subsequently, the delayed pulse in $D_3$ sets $T_1$ back to "1," indicating a negative carry.

I claim:

1. In an adder for combining two operands, the combination of: a first input circuit including a first lead and a second lead; means for applying a first pulse sequence, representative of a first operand, to the first input circuit, a pulse on the first or second lead during any of a series of predetermined intervals representing a first or second value, respectively, in said first pulse sequence; a second input circuit; means for applying a second pulse sequence, representative of a second operand, to the second input circuit; an output circuit; conditional circuits for operatively connecting said first and second leads to the output circuit under predetermined conditions of said conditional circuits to thereby apply to the output circuit a third pulse sequence which represents the arithmetic sum of the first and second operands; and means including a part of the second input circuit, and operable in response to the second operand pulse sequence, for establishing said predetermined conditions in said conditional circuits.

2. In an adder for combining two binary operands, the combination of: a first input circuit including a first lead and a second lead; means for applying a first pulse sequence, representative of a first binary operand, to the first input circuit, a pulse on the first or second lead during any of a series of predetermined intervals representing a first or second value, respectively; a second input circuit; means for applying a second pulse sequence, representative of a second binary operand, to the second input circuit, wherein the presence or absence of a pulse during any of said intervals represents said first or second value, respectively; an output circuit; conditional circuits for operatively connecting said first and second leads to the output circuit under predetermined conditions of said conditional circuits to thereby apply to the output circuit a third pulse sequence which represents the arithmetic sum of the first and second operands; and means including a part of the second input circuit and operable in response to pulses of the second pulse sequence for establishing said predetermined conditions in said conditional circuits.

3. In an adder for combining two binary operands, the combination of: a first input circuit including a first lead and a second lead; means for applying a first pulse sequence, representative of a first binary operand, to the first input circuit, wherein a pulse on the first or second lead during any of a series of predetermined intervals represents a first or second value, respectively; a second input circuit; means for applying a second pulse sequence, representative of a second binary operand, to the second input circuit, wherein the presence or absence of a pulse during any of said intervals represents said first or second value, respectively; an output circuit, conditional circuits for operatively connecting said first and second leads to the output circuit under predetermined conditions of said conditional circuits to thereby apply to the output circuit a third pulse sequence which represents the arithmetic sum of the first and second operands, the presence or absence of a pulse in the third pulse sequence during each of said intervals representing said first or second value, respectively; and means including a part of the second input circuit and operable in response to pulses of the second pulse sequence for establishing said predetermined conditions in said conditional circuits.

4. In an adder for combining two binary operands, the combination of: a first input circuit including a first lead and a second lead; means for applying a first pulse sequence, representative of a first binary operand, to the first input circuit, wherein a pulse on the first or second lead during any of a series of predetermined intervals represents a first or second value, respectively; a second input circuit; means for applying a second pulse sequence, representative of a second binary operand, to the second input circuit, wherein the presence or absence of a pulse during any of said intervals represents said first or second value, respectively; an output circuit, conditional circuits for operatively connecting the first and second leads to the output circuit under predetermined conditions of said conditional circuits to thereby apply to the output circuit a third pulse sequence which represents the arithmetic sum of the first and second operands; an element having two stable states of operation; means connecting the second input circuit to said element for reversing the latter from one stable state to the other in response to each pulse of the second operand pulse sequence; and means controlled by said element in its alternate stable states for establishing said predetermined conditions in said conditional circuits.

5. In an adder for combining two binary operands, the combination of: a first input circuit including a first lead and a second lead; means for applying a first pulse sequence, representative of a first binary operand, to the first input circuit, wherein a pulse on the first or second lead during any of a series of predetermined intervals represents a first or second value, respectively; a second input circuit; means for applying a second pulse sequence, representative of a second operand, to the second input circuit, wherein the presence or absence of a pulse during any of said intervals represents said first or second value, respectively; an output circuit; a first gate effective when armed to operatively connect the first lead to the output circuit; a second gate effective when armed to operatively connect the second lead to the output circuit; switching means operable to alternatively arm either the first or second gate; and a connection between the second input circuit and the switching means and effective in response to pulses of the second operand pulse sequence for operating said switching means to cause a combination pulse sequence to be transmitted from the first and second leads to the output circuit, said combination pulse sequence representing the arithmetic sum of the first and second operands.

6. In a device of the class described, the combination of: first, second and third input leads; means for applying a first pulse sequence to the first and second input leads, wherein a pulse on the first or second lead during any of a series of digit intervals represents a first or second value, respectively, in a first operand; means for applying a second pulse sequence to the third input lead wherein the presence or absence of a pulse during any of said intervals represents said first or second value, respectively, in a second operand; an output lead; a first gate effective upon being armed for operatively connecting the first input lead to the output lead; a second gate effective upon being armed for operatively connecting the second input lead to the output lead; a switching circuit having two states of operation; a connection from the third input lead to the switching circuit for reversing the latter from one of its states to the other in response to each pulse in the second pulse sequence; means operable in response to a first state of operation of the switching circuit for arming the first gate; and means operable in response to a second state of operation of the switching circuit for arming the second gate.

7. In a device according to claim 6, a third gate effective when armed for operatively connecting the second input lead to the switching circuit for causing the latter to assume its first state of operation in response to a pulse on said second input lead; and means for arming said third gate in response to the second state of operation of the switching circuit.

8. In a device according to clam 7, delay means; a fourth gate effective when armed for operatively connecting the third input lead to the switching circuit through the delay means for causing the switching circuit to assume its second state of operation, after a predetermined time delay, in response to a pulse applied to said third input lead; and means for arming said fourth gate in response to the second state of operation of the switching circuit.

9. In a device according to claim 6, a reset lead; a selectively operable control circuit for operatively connecting the reset lead to either the first or the second input lead; a third gate effective when armed for operatively connecting the reset lead to the switching circuit for causing the latter to assume its first state of operation in response to a pulse applied to the input lead to which the reset lead is operatively connected; and means for arming said third gate in response to the second state of operation of the switching circuit.

10. In a device according to claim 9, delay means; a fourth gate effective when armed for operatively connecting the third input lead to the switching circuit through the delay means for causing the switching circuit to assume its second state of operation, after a predetermined time delay, in response to a pulse applied to said third input lead; and means for arming said fourth gate in response to the second state of operation of the switching circuit.

11. In a device of the class described, the combination of: first, second and third input leads; means for applying a first pulse sequence to the first and second input leads wherein a pulse on the first or second lead during any of a series of digit intervals represents a first or second value, respectively, in a first operand; means for applying a second pulse sequence to the third input lead wherein the presence or absence of a pulse during any of said intervals represents said first or second value, respectively, in a second operand; an output lead; a first gate effective upon being armed for operatively connecting the first input lead to the output lead; a second gate having an input connected to the second input lead and an output connected to said output lead, said second gate being effective upon being armed for operatively connecting the second input lead to the output lead; a switching circuit having two states of operation; a connection from the third input lead to the switching circuit for reversing the latter from one of its states to the other in response to each pulse in the second pulse sequence; means operable in response to a first state of operation of the switching circuit for arming the first gate; means operable in response to a second state of operation of the switching circuit for arming the second gate; and means for connecting the output of the second gate to the switching means for causing the latter to assume its first state of operation in response to a pulse applied to said second input lead.

12. In a device according to claim 11, delay means; a third gate effective when armed for operatively connecting the third input lead to the switching circuit through the delay means for causing the switching circuit to assume its second state of operation, after a predetermined time delay, in response to a pulse applied to said third input lead; and means for arming said third gate in response to the second state of operation of the switching circuit.

13. In an adder for combining two binary operands, the combination of: a first lead and a second lead, wherein a pulse on the first lead represents the digit "1" and a pulse on the second lead represents the digit "0", and wherein a first binary operand is represented by a pulse on either the first or second lead during each of a series of digit intervals; a third lead wherein the presence of a pulse represents the digit "1" and the absence of a pulse represents the digit "0", and wherein a second binary operand is represented by the presence or absence of a pulse during each of said intervals; means for applying to the first and second leads a pair of pulse trains collectively representing the first operand; means operable prior to the application of the first operand to the first and second leads for applying to the third lead a pulse train representing the second operand; an output lead for receiving the sum of said operands represented by a pulse sequence wherein the presence of a pulse represents the digit "1" and the absence of a pulse represents the digit "0", and wherein said sum is represented by the presence or absence of a pulse during each of said intervals; an element having two stable states of operation and being initially in a first one of said states; a first state effective when armed to operatively connect the first lead to the output lead; a connection between the first gate and said element for arming the gate when said element is in its first state; a second gate effective when armed to operatively connect the second lead to the output lead; a connection between the second gate and said element for arming the second gate when said element is in its second state; a connection from the third lead to said element for reversing the latter in response to each pulse applied to the third lead; a conditional circuit connecting the third lead to said element for reversing the latter to its second state in response to an operand pulse applied to the third lead and subsequent to the application of the corresponding operand pulse to the first or second lead, said conditional circuit comprising, a delay means having an input and an output, a third gate effective when armed to operatively connect the third lead to the input of the delay means, and a connection from the output of the delay means to said element; a connection between the third gate and said element for arming the third gate when said element is in its second state; a fourth gate effective when armed to operatively connect the second lead to said element for causing the latter to assume its first state in response to a pulse applied to the second lead; and a connection between the fourth gate and said element for arming the gate when said element is in its second state.

14. In an adder for combining two binary operands; the combination of: a first lead and a second lead, wherein a pulse on the first lead represents a "1" and a pulse on the second lead represents a "0", and wherein a first binary operand is represented by a pulse on either the first or second lead during each of a series of digit intervals; a third lead wherein the presence of a pulse represents the digit "1" and the absence of a pulse represents the digit "0", and wherein a second binary operand is represented by the presence or absence of a pulse during each of said digit intervals; means for applying to the first and second leads a pair of pulse trains collectively representing the first operand; means operable prior to the application of the first operand to the first and second leads for applying to the third lead a pulse train representing the second operand; an output lead for receiving the sum of said operands, wherein the digit "1" is represented by the presence of a pulse and the digit "0" is represented by the absence of a pulse, and wherein said sum is represented by the presence or absence of a pulse during each of said digit intervals; an element having two stable states of operation and being initially in a first one of said states; a first gate effective when armed to operatively connect the first lead to the output lead; a connection between the first gate and said element for arming the first gate when said element is in its first state; a second gate effective when armed to operatively connect the second lead to the output lead; a unidirectional conductor connected between the second gate and the output lead for conducting pulses from the second gate to the output lead; a connection between the second gate and said element for arming the second gate when said element is in its second state; a connection from the third lead to said element for reversing the latter in response to each pulse applied to the third lead; a conditional circuit connecting the third lead to said element for causing the latter to assume its second state in response to an operand pulse applied to the third lead and subsequent to the application of the corresponding operand pulse to the first or second lead, said conditional circuit comprising, a delay means having an input and an output, a third gate effective when armed to operatively connect the third lead to the input of the delay means, and a connection from the output of the delay means to said element; a connection between the third gate and said element for arming the third gate when said element is in its second state; and a connection between the output of the second gate and said element for causing the latter to assume its first state in response to an output pulse from the second gate.

15. In an adder for combining two binary operands, the combination of: a first lead and a second lead, wherein a pulse on the first lead represents the digit "1" and a pulse on the second lead represents the digit "0", and wherein a first binary operand is represented by a pulse on either the first or second lead during each of a series of digit intervals; a third lead wherein the presence of a pulse represents the digit "1" and the absence of a pulse represents the digit "0", and wherein a second binary operand is represented by the presence or absence of a pulse during each of said digit intervals; means for applying to the first and second leads a pair of pulse trains collectively representing the first operand; means operable prior to the application of the first operand to the first and second leads for applying to the third lead a pulse train representing the second operand; an output lead for receiving the sum of said operands represented by a pulse sequence wherein the digit "1" is represented by the presence of a pulse and the digit "0" is represented by the absence of a pulse, and wherein said sum is represented by the presence or absence of a pulse during each of said digit intervals; a first element having two stable states of operation and being initially in a first one of said states; a first gate effective when armed to operatively connect the first lead to the output lead; a connection between the first gate and the first element for arming the gate when the first element is in its first state; a second gate effective when armed to operatively connect the second lead to the output lead; a connection between the second gate and the first element for arming the second gate when the first element is in its second state; a connection from the third lead to the first element for reversing the latter in response to each pulse applied to the third lead; a conditional circuit connecting the third lead to the first element for reversing the latter to its second state in response to each operand pulse applied to the third lead and subsequent to the application of a corresponding operand pulse to the first or second lead, said conditional circuit comprising, a delay means having an input and an output, a third gate effective when armed to operatively connect the third lead to the input of the delay means, a connection from the output of the delay means to the first element, and a connection between the third gate and the first element for arming the third gate when the first element is in its second state; a reset lead; a fourth gate effective when armed to operatively connect the reset lead to the first element for causing the latter to assume its first state in response to a pulse appearing on the reset lead; a connection between the fourth gate and the first element for arming the fourth gate when the first element is in its second state; and means for selectively connecting the reset lead to the first or second lead, said means comprising, a second element having two stable states and being normally in a first one of said states, a fifth gate effective when armed to operatively connect the second lead to the reset lead, a connection between the fifth gate and the second element for arming the fifth gate when the second element is in its first state, a sixth gate effective when armed to operatively connect the first lead to the reset lead, a connection between the sixth gate and the second element for arming the sixth gate when the second element is in its second state, and selectively operable means for causing the second element to assume either its first or its second state.

References Cited in the file of this patent

UNITED STATES PATENTS

| | | |
|---|---|---|
| 2,552,760 | Baker | May 15, 1951 |
| 2,590,950 | Eckert, Jr. et al. | Apr. 1, 1952 |
| 2,610,790 | Elliott | Sept. 16, 1952 |
| 2,611,536 | Barrow | Sept. 23, 1952 |